(12) United States Patent
Stubbert

(10) Patent No.: US 12,319,760 B2
(45) Date of Patent: Jun. 3, 2025

(54) BIDENTATE DIAZINYLAMIDO COMPLEXES AS CATALYSTS FOR OLEFIN POLYMERIZATION

(71) Applicant: Dow Global Technologies LLC, Midland, MI (US)

(72) Inventor: Bryan D. Stubbert, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 669 days.

(21) Appl. No.: 17/623,134

(22) PCT Filed: Jun. 26, 2020

(86) PCT No.: PCT/US2020/039771
§ 371 (c)(1),
(2) Date: Dec. 27, 2021

(87) PCT Pub. No.: WO2020/264261
PCT Pub. Date: Dec. 30, 2020

(65) Prior Publication Data
US 2022/0227904 A1    Jul. 21, 2022

Related U.S. Application Data

(60) Provisional application No. 62/868,513, filed on Jun. 28, 2019.

(51) Int. Cl.
| | | |
|---|---|---|
| C08F 4/64 | (2006.01) | |
| C07F 7/00 | (2006.01) | |
| C07F 17/00 | (2006.01) | |
| C08F 4/76 | (2006.01) | |
| C08F 210/16 | (2006.01) | |

(52) U.S. Cl.
CPC ........... C08F 210/16 (2013.01); C07F 7/003 (2013.01); C08F 4/64044 (2013.01); C07F 17/00 (2013.01)

(58) Field of Classification Search
CPC .................. C08F 4/64044; C07F 17/00
See application file for complete search history.

(56) References Cited

U.S. PATENT DOCUMENTS

| | | | | |
|---|---|---|---|---|
| 3,740,384 A | * | 6/1973 | Ballard | C08F 10/00 526/126 |
| 6,136,748 A | * | 10/2000 | Smith | C07F 7/28 502/167 |
| 6,864,205 B2 | | 3/2005 | Murray | |
| 6,919,467 B2 | | 7/2005 | Murray | |
| 7,001,863 B2 | | 2/2006 | Murray | |
| 7,129,305 B2 | | 10/2006 | Murray | |
| 7,199,255 B2 | | 4/2007 | Murray et al. | |

FOREIGN PATENT DOCUMENTS

| | | |
|---|---|---|
| EP | 0889061 A1 | 1/1999 |
| WO | 1998/049208 A1 | 11/1998 |
| WO | 9901460 A1 | 1/1999 |
| WO | 0238628 A2 | 5/2002 |
| WO | 0246249 A2 | 6/2002 |
| WO | 2011102990 A2 | 8/2011 |
| WO | 2017/0173079 A1 | 10/2017 |

OTHER PUBLICATIONS

International Search Report and Written Opinion issued by the European Patent Office acting as International Searching Authority for International Patent Application No. PCT/US2020/039771 dated Oct. 1, 2020 (15 total pages).
Japanese Office Action dated Apr. 9, 2024, pertaining to JP Patent Application No. 2021-575902, 6 pgs.
Brazil Office Action dated Oct. 10, 2023, pertaining to BR Patent Application No. BR112021026322.5, 3 pgs.
Chinese Office Action dated Oct. 24, 2023, pertaining to CN Patent Application No. 202080046440.4, 8 pgs.
Singapore Written Opinion and Search Report, dated Aug. 23, 2023, pertaining to Singapore Patent Application No. 11202113805V, 13 pgs.
161/162 Communication dated Feburary 4, 2022, pertaining to EP Patent Application No. 20743016.6, 3 pgs.
International Preliminary Report on Patentability dated Dec. 28, 2021, pertaining to Int'l Patent Application No. PCT/US2020/039771, 9 pgs.

* cited by examiner

*Primary Examiner* — Rip A Lee
(74) *Attorney, Agent, or Firm* — Dinsmore & Shohl LLP

(57) ABSTRACT

Catalyst systems comprising a metal-ligand complex according to formula (I):

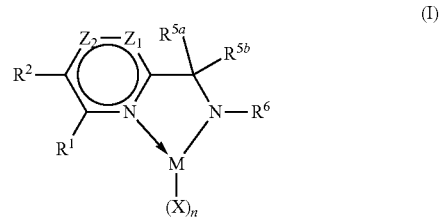

where: M is a metal chosen from zirconium or hafnium, the metal having a formal oxidation state of +2, +3, or +4; each X is a monodentate or bidentate ligand independently chosen from $(C_1-C_{40})$ hydrocarbyl, $(C_6-C_{20})$ aryl, $(C_6-C_{20})$ heteroaryl, or halogen; n is 2 or 3; $R^1$, $R^2$, $R^{5a}$, $R^{5b}$, and $R^6$ are independently chosen from $(C_1-C_{40})$ hydrocarbyl, $(C_1-C_{40})$ heterohydrocarbyl, —Si$(R^C)_3$, —N$(R^N)_2$, —OR$^C$, halogen, or hydrogen; optionally, $R^1$ and $R^2$ are covalently linked to form an aromatic ring; $z_1$ and $z_2$ are independently C($R^Z$) or N, wherein each $R^Z$ is —H or $(C_1-C_{30})$ hydrocarbyl; provided that at least one of $z_1$ and $z_2$ is N; and each $R^C$ and $R^N$ in formula (I) is independently a $(C_1-C_{30})$ hydrocarbyl.

11 Claims, 3 Drawing Sheets

BIDENTATE DIAZINYLAMIDO COMPLEXES AS CATALYSTS FOR OLEFIN POLYMERIZATION

CROSS-REFERENCE TO RELATED APPLICATIONS

This application is a National Stage Entry under 35 U.S.C. § 371 of International Patent Application No. PCT/US2020/039771, filed Jun. 26, 2020, which claims the benefit of U.S. Provisional Patent Application Ser. No. 62/868,513 filed Jun. 28, 2019, both of which are hereby incorporated by reference in their entireties.

TECHNICAL FIELD

Embodiments of the present disclosure generally relate to olefin polymerization catalyst systems and processes, and, more specifically, to olefin polymerization catalyst systems including bidentate diazinylamido Group IV transition metal catalysts and to olefin polymerization processes incorporating the catalyst systems.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers and propylene-based are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutene. Hydrogen may also be added to the reactor. The catalyst systems for producing ethylene-based may typically comprise a chromium-based catalyst system, a Ziegler-Natta catalyst system, and/or a molecular (either metallocene or non-metallocene (molecular)) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

Embodiments of this disclosure include catalyst systems. The catalyst systems include a metal-ligand complex according to formula (I):

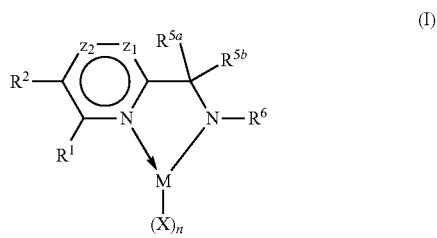

(I)

In formula (I), M is a metal chosen from zirconium or hafnium, the metal having a formal oxidation state of +2, +3, or +4. Each X is a monodentate or bidentate ligand chosen from $(C_1-C_{40})$hydrocarbyl, $(C_6-C_{20})$aryl, or $(C_6-C_{20})$heteroaryl. Subscript n of $(X)_n$ is 2 or 3.

In formula (I), $R^1$, $R^2$, $R^{5a}$, $R^{5b}$, and $R^6$ are independently chosen from $(C_1-C_{40})$hydrocarbyl, $(C_1-C_{40})$heterohydrocarbyl, —Si$(R^C)_3$, —N$(R^N)_2$, —O$R^C$, halogen, or hydrogen; optionally, $R^1$ and $R^2$ are covalently linked to form an aromatic ring, $z_1$ and $z_2$ are independently C($R^Z$) or N, wherein each $R^Z$ is —H or $(C_1-C_{30})$hydrocarbyl; provided that at least one of $z_1$ and $z_2$ is N; and each $R^C$, $R^N$, and $R^P$ in formula (I) is independently a $(C_1-C_{30})$hydrocarbyl.

Embodiments of this disclosure include polymerization processes, particularly processes for producing ethylene-based polymers. The polymerization processes include contacting ethylene and optionally one or more $(C_3-C_{12})\alpha$-olefin in the presence of a catalyst system including a metal-ligand complex having a structure according to formula (I).

DETAILED DESCRIPTION

Figure 1:
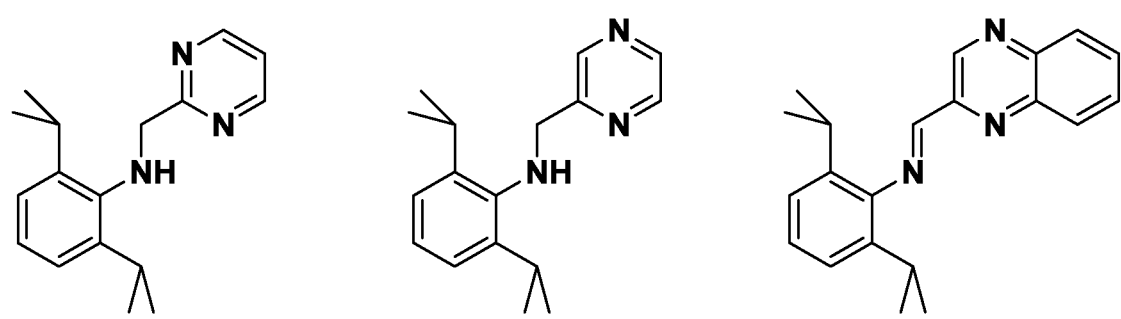
FIG. 1 illustrates the Ligands 1 to 3.
Figure 2A:
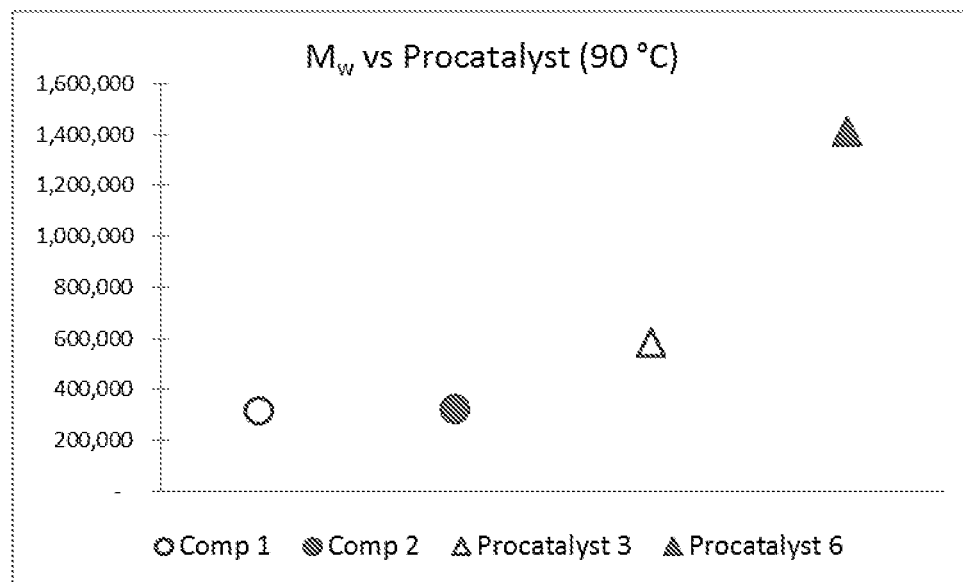
FIG. 2A is a plot of the molecular weight of the polymer produced from the inventive and comparative procatalysts, in which $B(C_6F_5)_3$ is the cocatalyst and the polymerization reaction was run at 90° C.
Figure 2B:
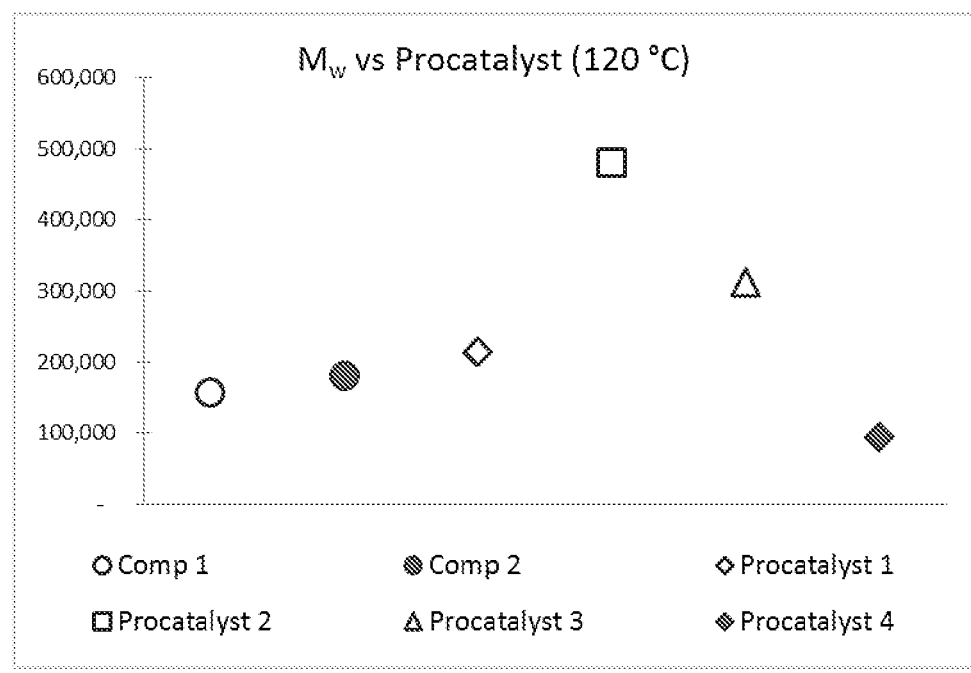
FIG. 2B is a plot of the molecular weight of the polymer produced from the inventive and comparative procatalysts, in which $B(C_6F_5)_3$ is the cocatalyst and the polymerization reaction was run at 120° C.
Figure 3A:
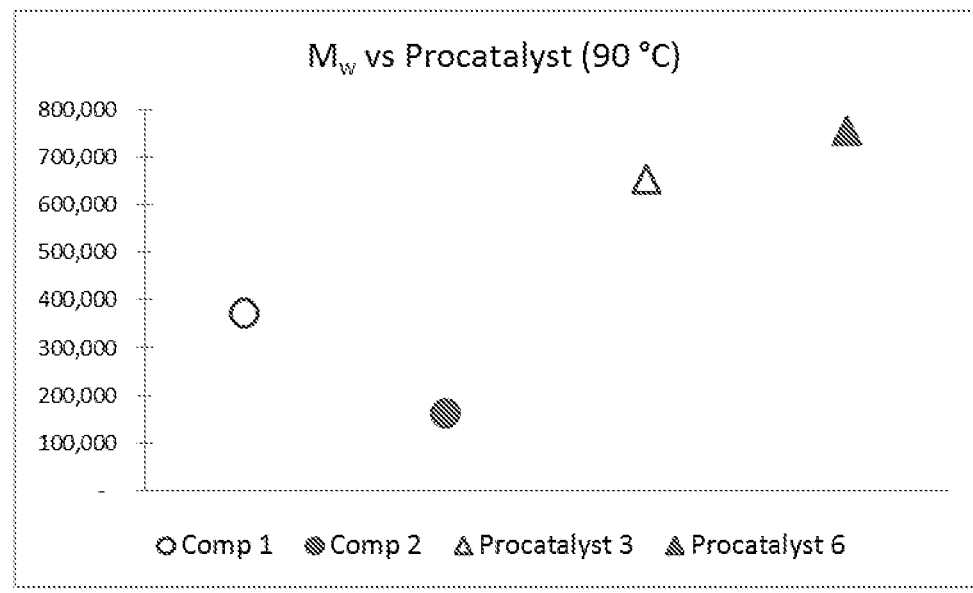
FIG. 3A is a plot of the molecular weight of the polymer produced from the inventive and comparative procatalysts, in which bis(octadecyl)methylammonium tetrakis(pentafluorophenyl)borane is the cocatalyst and the polymerization reaction was run at 90° C.
Figure 3B:
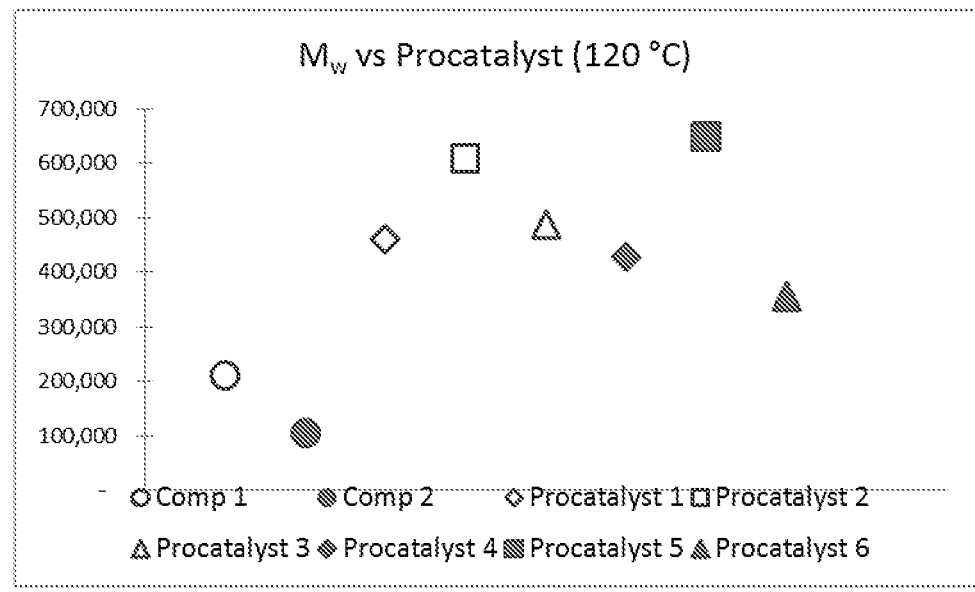
FIG. 3B is a plot of the molecular weight of the polymer produced from the inventive and comparative procatalysts, in which bis(octadecyl)methylammonium tetrakis(pentafluorophenyl)borane is the cocatalyst and the polymerization reaction was run at 120° C.

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf trifluoromethane sulfonate; THF: tetrahydrofuran; $Et_2O$: diethyl ether; $CH_2Cl_2$ dichloromethane; CV: column volume (used in column chromatography); EtOAc: ethyl acetate; $C_6D_6$: deuterated benzene or benzene-d6: $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyllithium; $Cu_2O$: Copper (I) Oxide; N,N'-DMEDA: N,N'-dimethylethylenediamine; $K_3PO_4$: Potassium phosphate tribasic; $Pd(AmPhos)Cl_2$: Bis(di-tert-butyl(4-dimethylaminophenyl)phosphine)dichloropalladium(II); Pd(dppf)$Cl_2$: [1,1'-Bis(diphenylphosphino)ferrocene]palladium(II) dichloride; $K_2CO_3$: potassium carbonate; $Cs_2CO_3$: cesium carbonate; i-PrOBPin: 2-isopropoxy-4,4,5,5-tetramethyl-1,3,2-dioxaborolane; $BrCl_2CCCl_2Br$: 1,2-dibromotetrachloroethane; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $ZrBn_2Cl_2(OEt_2)$: zirconium (IV) dibenzyl dichloride mono-diethyletherate; $HfBn_2Cl_2(OEt_2)$: hafnium (IV) dibenzyl dichloride mono-diethyletherate; $TiBn_4$: titanium (IV) tetrabenzyl; $N_2$: nitrogen gas; PhMe: toluene; PPR: parallel polymerization reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; $R_f$: retention fraction; TLC; thin-layered chromatography; rpm: revolution per minute.

The term "independently selected" followed by multiple options is used herein to indicate that individual R groups appearing before the term, such as $R^1$, $R^2$, and $R^5$, can be identical or different, without dependency on the identity of any other group also appearing before the term.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—$C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms, in which each hydrocarbon radical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—$CH_2$—$C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_{50})$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclyc aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis($[C_{20}]$alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

The term "heteroatom," refers to an atom other than hydrogen or carbon. Examples of groups containing one or more than one heteroatom include O, S, S(O), $S(O)_2$, $Si(R^C)_2$, $P(R^P)$, $N(R^N)$, $-N=C(R^C)_2$, $-Ge(R^C)_2-$, or $-Si(R^C)-$, where each $R^C$ and each $R^P$ is unsubstituted $(C_1-C_{18})$hydrocarbyl or $-H$, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more R), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-$S(O)_2$—, $(C_1-C_{50})$hydrocarbyl-$Si(R^C)_2$—, $(C_1-C_{50})$hydrocarbyl-$N(R^N)$—, $(C_1-C_{50})$hydrocarbyl-$P(R^P)$—, $(C_2-C_{19})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclyc heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 11H-benzo[f] indol-1-yl. An example of the fused 6,5,6-ring system is 9H-carbazol-9-yl. An example of the fused 6,5,6-ring system is 91H-carbazol-9-yl. An example of the fused 6,6,6-ring system is acrydin-9-yl.

The term "$(C_1-C_{50})$heteroalkyl" means a saturated straight or branched chain radicals containing one to fifty carbon atoms, or fewer carbon atoms and one or more of the heteroatoms. The term "$(C_1-C_{50})$heteroalkylene" means a saturated straight or branched chain diradicals containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, $P)(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl. 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorous, or carbon-silicon double bonds, not including double bonds that may be present in substituents $R^S$, if any, or in (hetero) aromatic rings, if any.

Embodiments of this disclosure include procatalysts, catalyst systems, and polymerization processes that include the catalyst systems of this disclosure. The catalyst systems include a metal-ligand complex according to formula (I):

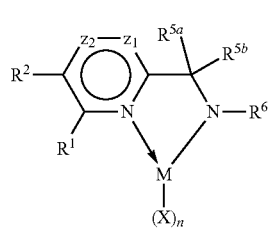

(I)

In formula (I), M is a metal chosen from zirconium or hafnium, the metal having a formal oxidation state of +2, +3, or +4. Each X is a monodentate or bidentate ligand chosen from $(C_1-C_{40})$hydrocarbyl, $(C_6-C_{20})$aryl, or $(C_6-C_{20})$heteroaryl. Subscript n of $(X)_n$ is 2 or 3.

In formula (I), $R^1$, $R^2$, $R^{5a}$, $R^{5b}$, and $R^6$ are independently chosen from $(C_1-C_{40})$hydrocarbyl, $(C_1-C_{40})$heterohydrocarbyl, $—Si(R^C)_3$, $—N(R^N)_2$, $—OR^C$, halogen, or hydrogen; optionally, $R^1$ and $R^2$ are covalently linked to form an aromatic ring. $z_1$ and $z_2$ are independently $C(R^Z)$ or N, wherein each $R^Z$ is —H or $(C_1-C_{30})$hydrocarbyl; provided that at least one of $z_1$ and $z_2$ is N; and each $R^C$, $R^N$, and $R^P$ in formula (I) is independently a $(C_1-C_{30})$hydrocarbyl.

In one or more embodiments, $R^1$ and $R^2$ are covalently linked to form an aromatic ring, and the metal-ligand complex according to formula (II):

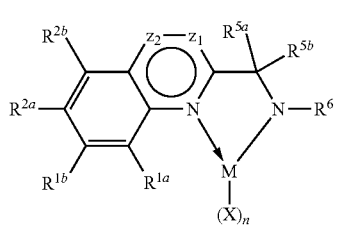

(II)

In formula (II), $R^{1a}$, $R^{1b}$, $R^{2a}$, $R^{2b}$ are independently $(C_1-C_{30})$alkyl or —H; and $R^{5a}$, $R^{5b}$, $z_1$, $z_2$, X, n, and M are as defined in formula (I).

In one or more embodiments, in formula (I), $z_1$ is $C(R^Z)$ and $z_2$ is N, wherein in $R^Z$ is —H or $(C_1-C_{30})$hydrocarbyl. In other embodiments, $z_1$ is N and $z_2$ is $C(R^Z)$, wherein in $R^Z$ is —H or $(C_1-C_{30})$hydrocarbyl.

In one or more embodiments, $R^Z$ is hydrogen or $(C_1-C_{20})$alkyl. In various embodiments, $R^Z$ is hydrogen, methyl, ethyl, 1-propyl, 2-propyl, 1-butyl, 2-methylpropyl, 1,1-dimethylethyl, n-pentyl, cyclopentyl, n-hexyl, heptyl, n-octyl, or tert-octyl.

In various embodiments, in formulas (I) or (II), $R^6$ is a substituted $(C_6-C_{40})$aryl or an unsubstituted $(C_6-C_{40})$aryl. In one or more embodiments, $R^6$ is independently selected from phenyl, benzyl, (2,4,6-tri-iso-propyl)phenyl, (2,6-di-iso-propyl)phenyl, 3,5-di-tert-butylphenyl, naphthyl, or cyclopropyl.

In some embodiments, in formulas (I) or (II), $R^6$ is hydrogen, $R^{5a}$ is hydrogen, and $R^{5b}$ is independently chosen from $(C_1-C_{40})$hydrocarbyl or $(C_1-C_{40})$heterohydrocarbyl. In one or more embodiments, $R^{5b}$ is independently chosen from phenyl, benzyl, (2,4,6-tri-iso-propyl)phenyl, (2,6-di-iso-propyl)phenyl, 3,5-di-tert-butylphenyl, naphthyl, or cyclopropyl. In some embodiments, at least one of $R^{5a}$ and $R^{5b}$ is $(C_1-C_{40})$hydrocarbyl or $(C_1-C_{40})$heterohydrocarbyl.

In one or more embodiments, only one of $R^{5a}$ and $R^{5b}$ is selected from the group consisting of pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-1-yl; tetrazol-5-yl; pyridine-2-yl; pyrimidin-2-yl; pyrazin-2-yl; quinolin-2-yl; isoquinolin-1-yl; and 9H-carbazol-9-yl.

In one or more embodiments, in formula (II). $R^{1a}$, $R^{1b}$, $R^{2a}$, $R^{2b}$ are independently hydrogen, methyl, ethyl, 1-propyl, 2-propyl, 1-butyl, 2-methylpropyl, 1,1-dimethylethyl, n-pentyl, cyclopentyl, n-hexyl, heptyl, n-octyl, or tert-octyl.

In the metal-ligand complex according to formula (I) or formula (II), each X bonds with M through a covalent bond, a dative bond, or an ionic bond. In some embodiments, each X is identical. The metal-ligand complex has 6 or fewer metal-ligand bonds and can be overall charge-neutral or may have a positive-charge associated with the metal center. In some embodiments, the catalyst system includes a metal-ligand complex according to formula (I), in which M is zirconium or hafnium; each X is independently chosen from $(C_1-C_{20})$alkyl, $(C_1-C_{20})$heteroalkyl, $(C_6-C_{20})$aryl, $(C_4-C_{20})$heteroaryl, $(C_4-C_{12})$diene, or a halogen. In one or more embodiments, each X is independently benzyl, phenyl, or chloro.

In some embodiments, the monodentate ligand may be a monoanionic ligand. Monoanionic ligands have a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, sulfate, $HC(O)O^-$, $HC(O)N(H)^-$, $(C_1-C_{40})$hydrocarbylC$(O)O^-$, $(C_1-C_{40})$hydrocarbylC$(O)N((C_1-C_{20})$hydrocarbyl$)^-$, $(C_1-C_{40})$hydrocarbylC$(O)N(H)^-$, $R^KR^LB^-$, $R^KR^LN^-$, $R^KO^-$, $R^KS^-$, $R^KR^LP^-$, or $R^MR^KR^L$ Si$^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In other embodiments, at least one monodentate ligand X, independently from any other ligands X, may be a neutral ligand. In specific embodiments, the neutral ligand is a neutral Lewis base group such as $R^QNR^KR^L$, $R^KOR^L$, $R^KSR^L$, or $R^Q$ $PR^KR^L$, where each $R^Q$ independently is hydrogen, $[(C_1-C_{10})$hydrocarbyl$]_3Si(C_1-C_{10})$hydrocarbyl, $(C_1-C_{40})$hydrocarbyl, $[(C_1-C_{10})$hydrocarbyl$]_3Si$, or $(C_1-C_{40})$heterohydrocarbyl and each $R^K$ and $R^L$ independently is as previously defined.

Additionally, each X can be a monodentate ligand that, independently from any other ligands X, is a halogen, unsubstituted $(C_1-C_{20})$hydrocarbyl, unsubstituted $(C_1-C_{20})$hydrocarbylC(O)O—, or $R^KR^LN$—, wherein each of $R^K$ and $R^L$ independently is an unsubstituted$(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$—, wherein each of $R^K$ and $R^L$ independently is an unsubstituted $(C_1-C_{10})$hydrocarbyl. In one or more embodiments of formula (I), (II), and (III), X is benzyl, chloro, $—CH_2SiMe_3$, or phenyl.

In further embodiments, each X is selected from methyl; ethyl; 1-propyl; 2-propyl; 1-butyl; 1,1-dimethylethyl; 2-methylpropyl; trimethylsilylmethyl; phenyl; benzyl; or chloro. In some embodiments, each X is the same. In other embodiments, at least two X are different from each other. In the embodiments in which at least two X are different from at least one X, X is a different one of methyl; ethyl; 1-propyl; 2-propyl; 1-butyl; 1,1-dimethylethyl; 2-methylpropyl; trimethylsilylmethyl; phenyl; benzyl; and chloro. In further embodiments, the bidentate ligand is 2,2-dimethyl-2-silapropane-1,3-diyl or 1,3-butadiene.

In some embodiments, any or all of the chemical groups (e.g., X and $R^1$—$R^4$) of the metal-ligand complex of formula (I) may be unsubstituted. In other embodiments, none, any, or all of the chemical groups X and $R^1$—$R^4$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X and $R^1$—$R^4$ may be persubstituted with $R^S$. In the chemical groups that are persubstituted with $R^S$, the individual $R^S$ may all be the same or may be independently chosen.

Embodiments of this disclosure include polymerization processes. The polymerization processes include contacting ethylene and optionally one or more ($C_3$-$C_{12}$)α-olefin in the presence of a catalyst system under olefin polymerization conditions to form an ethylene-based polymer. The catalyst system includes a metal-ligand complex according to formula (I).

Embodiments of this disclosure include procatalysts. The procatalysts may be suitable for use as metal-ligand complexes in polymerization processes. Procatalysts according to embodiments are metal-ligand complexes having formula (I) or formula (II) as previously described with respect to the catalyst systems.

In illustrative embodiments, the catalyst systems may include a metal-ligand complex according to formula (I) having the structure of any of the Procatalysts 1-22 listed below. The Procatalysts 1-6 may be synthesized from the corresponding Ligands 1-3, as shown in FIG. 1:

Procatalyst 1

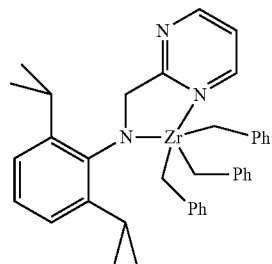

Procatalyst 2

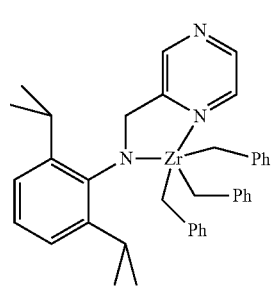

Procatalyst 3

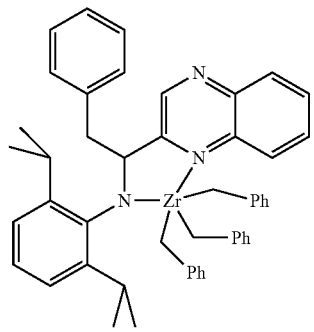

Procatalyst 4

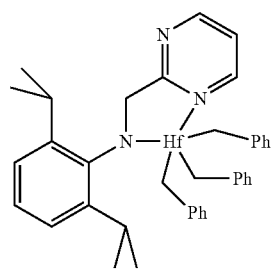

Procatalyst 5

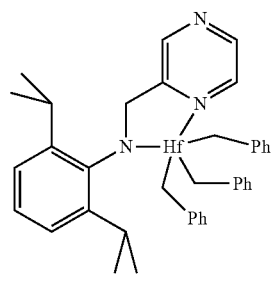

Procatalyst 6

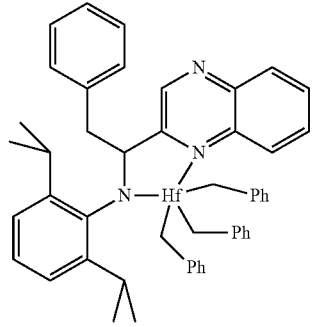

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing $(C_1-C_{20})$hydrocarbyl substituents as described herein. In some embodiments, Group 13 metal compounds are tri$((C_1-C_{20})$hydrocarbyl)-substituted-aluminum or tri$((C_1-C_{20})$hydrocarbyl)-boron compounds. In other embodiments, Group 13 metal compounds are tri(hydrocarbyl)-substituted-aluminum, tri$((C_1-C_{20})$hydrocarbyl)-boron compounds, tri$((C_1-C_{10})$alkyl)aluminium, tri$((C_6-C_{18})$aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris$((C_1-C_{20})$hydrocarbyl borate (e.g. trityl tetrafluoroborate) or a tri$((C_1-C_{20})$hydrocarbyl)ammonium tetra$((C_1-C_{20})$hydrocarbyl)borane (e.g. bis(octadecyl)methylammonium tetrakis(pentafluorophenyl)borane). As used herein, the term "ammonium" means a nitrogen cation that is a $((C_1-C_{20})$hydrocarbyl$)_4$N$^+$ a $((C_1-C_{20})$hydrocarbyl$)_3$N(H)$^+$, a $((C_1-C_{20})$hydrocarbyl$)_2$N(H)$_2^+$, $(C_1-C_{20})$hydrocarbylN(H)$_3^+$, or N(H)$_4^+$, wherein each $(C_1-C_{20})$hydrocarbyl, when two or more are present, may be the same or different.

Combinations of neutral Lewis acid activating co-catalysts include mixtures comprising a combination of a tri $((C_1-C_4)$alkyl)aluminum and a halogenated tri$((C_6-C_{18})$aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(I—) amine, and combinations thereof.

In some embodiments, more than one of the foregoing activating co-catalysts may be used in combination with each other. A specific example of a co-catalyst combination is a mixture of a tri$((C_1-C_4)$hydrocarbyl)aluminum, tri$((C_1-C_4)$hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene. 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene based polymer, the amount of additional α-olefin is less than 50%; other embodiments include at least 0.5 mole percent (mol %) to 25 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm³ to 0.950 g/cm³, from 0.880 g/cm³ to 0.920 g/cm³, from 0.880 g/cm³ to 0.910 g/cm³, or from 0.880 g/cm³ to 0.900 g/cm³, for example.

In another embodiment, the polymer resulting from the catalyst system that includes the metal-ligand complex of formula (I) has a melt flow ratio ($I_{10}/I_2$) from 5 to 15, in which melt index $I_2$ is measured according to ASTM $D_{1238}$ (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening is performed in a high throughput parallel pressure reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of a procatalyst in toluene. All liquids (for example, solvent, 1-octene, chain shuttling agent solutions as appropriate to the experiment, and catalyst solutions) are added to the single-cell reactors via robotic syringes. Gaseous reagents (i.e. ethylene, H₂) are added to the single-cell reactors via a gas injection port. Prior to each run, the reactors are heated to 80° C., purged with ethylene, and vented.

A portion of Isopar-E is added to the reactors. The reactors are heated to the run temperature and pressured to the appropriate psig with ethylene. Toluene solutions of reagents are added in the following order: (1) 1-octene with 500 nmol of scavenger MMAO-3A; (2) activator (cocatalyst-1, cocatalyst-2, etc); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of ethylene gas by opening the valve at the set point minus 1 psi and closing it when the pressure reached 2 psi higher. All drops in pressure are cumulatively recorded as "Uptake" or "Conversion" of the ethylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (50 psig for 120° C. runs, 75 psig for 150° C. runs). After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

SymRAD HT-GPC Analysis

The molecular weight data is determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 μL aliquot of the sample. The GPC is equipped with two Polymer Labs PLgel 10 μm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR anylsis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

Batch Reactor Polymerization Procedure

The batch reactor polymerization reactions are conducted in a 4 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4Å molecular sieves, the second containing Q5 reactant. The N₂, used for transfers, is passed through a single column containing A204 alumina, 4Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 88 g ethylene and 568 g 1-octene in 1155 g of IsoparE, and the standard conditions at 150° C. are 81 g ethylene and 570 g 1-octene in 1043 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

EXAMPLES

Examples 1 to 6 are synthetic procedures for ligand intermediates, ligands, and isolated procatalysts Structures of Ligands 1 to 3 are provided in FIG. 1. Procatalysts 1 to 6 were synthesized from the Ligands 1 to 3. Example 7 provides the reaction conditions and polymerization procedure. In Example 8, the results of the polymerization reactions of Procatalysts 1-6 are tabulated and discussed. One or more features of the present disclosure are illustrated in view of the examples as follows:

Example 1—Synthesis of Intermediate 1. Diazinylimines 1 was prepared by condensation of the corresponding aldehyde with 2,6-diisopropyl aniline in methanol. Aldehyde (1.0 g, 9.2 mmol) dissolved in methanol (20 mL) was stirred at room temperature while neat aniline (1.8 g, 10.2 mmol) was added dropwise. The mixture was blanketed under inert atmosphere and heated at 65° C. for 24 hours. Intermediate 1 was precipitated from 2:1 toluene/hexanes at −10° C. in 66% yield. $^1$H NMR (400 MHz, CDCl$_3$) δ 8.96 (d, J=4.9 Hz, 1H), 8.35 (s, 1H), 7.40 (t, J=4.9 Hz, 1H), 7.20-7.11 (m, 2H), 3.00 (hept, J=6.9 Hz, 1H), 1.69 (s, 1H), 1.17 (d, J=6.9 Hz, 6H). $^{13}$C NMR (101 MHz, CDCl$_3$) δ 161.97, 161.66, 157.97, 148.46, 137.29, 124.91, 123.18, 121.68, 28.02, 23.81.

Example 2—Synthesis of Intermediate 2. Diazinylimine 2 was prepared by condensation of the corresponding aldehyde with 2,6-diisopropyl aniline in methanol. Aldehyde (1.0 g, 9.2 mmol) dissolved in methanol (20 mL) was stirred at room temperature while neat aniline (1.8 g, 10.2 mmol) was added dropwise. The mixture was blanketed under inert atmosphere and heated at 65° C. for 24 hours. Intermediate 2 was precipitated at −10° C. from 2:1 toluene/hexanes in 28% yield. $^1$H NMR (400 MHz, CDCl$_3$) δ 9.49 (dd, J=1.5, 0.5 Hz, 1H), 8.72-8.64 (m, 2H), 8.34 (d, J=0.5 Hz, 1H), 7.22-7.11 (m, 3H), 2.96 (hept, J=6.8 Hz, 2H), 1.64 (s, 1H), 1.19 (d, J=6.9 Hz, 12H). $^{13}$C NMR (101 MHz, CDCl$_3$) δ 161.32, 149.37, 148.15, 145.98, 144.36, 143.77, 137.28, 125.06, 123.32, 28.18, 23.60.

Example 3—Synthesis of Intermediate 3. Neat 2,6-diisopropyl aniline (1.51 g, 8.52 mmol) was added dropwise to a stirred red suspension of quinoxaline-2-carboxaldehyde (0.934 g, 5.91 mmol) in dichloromethane (15 mL) at room temperature, followed by solid magnesium sulfate (1 g) added in a single portion. The red-orange suspension was stirred overnight under inert atmosphere. The mixture was filtered after 24 hours at room temperature. The combined red solution was diluted with two volume equivalents of methanol and a few drops of hexanes, then cooled at −10° C. The product was recovered as orange needles in 39% yield (1.060 g, 3.34 mmol). $^1$H NMR (400 MHz, CDCl$_3$) δ 9.80 (s, 1H), 8.50 (d, J=0.4 Hz, 1H), 8.24-8.15 (m, 2H), 7.91-7.79 (m, 2H), 7.24-7.13 (m, 3H), 3.01 (hept, J=6.9 Hz, 2H), 1.21 (d, J=6.8 Hz, 13H). $^{13}$C NMR (101 MHz, CDCl$_3$) δ 161.97, 148.49, 148.21, 143.84, 143.42, 142.12, 137.22, 131.30, 130.70, 129.96, 129.66, 125.13, 123.33, 28.23, 23.61.

Example 4—Synthesis of Ligand 1. A 200 mL sidearm flask with a stir bar was charged with Intermediate 1 (0.5 g, 2 mmol) under inert atmosphere. With N$_2$ outflow, methanol (50 mL) was added. The flask was cooled in an ice bath for 15 minutes and solid NaBH$_4$ (0.75 g, 20 mmol) was added portionwise under gentle N$_2$ purge. Gas evolution was observed during addition. After complete addition, the flask remained in the ice bath as the yellow mixture was allowed to stir under inert atmosphere and slowly warm to room temperature overnight. The reaction was quenched by addition of an aqueous ammonium chloride solution (75 mL), and the resulting suspension was extracted with CH$_2$Cl$_2$ (3×40 mL). The combined organic phases were dried over Na$_2$SO$_4$ and evacuated to dryness on the rotavap. Pyrimidine amine Ligand 1 was isolated as a yellow-orange oil in 88% yield. $^1$H NMR (400 MHz, C$_6$D$_6$) δ 8.14 (d, J=4.9 Hz, 1H), 7.16-7.09 (m, 1H), 6.19-6.11 (m, 3H), 4.84 (s, 1H), 4.58 (s, 1H), 3.67 (hept, J=6.8 Hz, 1H), 1.26 (d, J=6.9 Hz, 6H). $^{13}$C NMR (101 MHz, CDCl$_3$) δ 168.10, 157.22, 143.35, 142.61, 123.94, 123.75, 119.47, 57.02, 27.99, 24.41.

Example 5—Synthesis of Ligand 2. A 200 mL sidearm flask with a stir bar was charged with Intermediate 2 (0.5 g, 2 mmol) under inert atmosphere. With N$_2$ outflow, methanol (50 mL) was added. The flask was cooled in an ice bath for 15 minutes and solid NaBH$_4$ (0.75 g, 20 mmol) was added portionwise under gentle N$_2$ purge. Gas evolution was observed during addition. After complete addition, the flask remained in the ice bath as the yellow mixture was allowed to stir under inert atmosphere and slowly warm to room temperature overnight. The reaction was quenched by addition of an aqueous ammonium chloride solution (75 mL), and the resulting suspension was extracted with CH$_2$Cl$_2$ (3×40 mL). The combined organic phases were dried over Na$_2$SO$_4$ and evacuated to dryness on the rotavap. Pyrazine amine Ligand 2 was isolated as a yellow-orange oil in 98% yield. $^1$H NMR (400 MHz, CDCl$_3$) δ 9.49 (dd, J=1.5, 0.5 Hz, 1H), 8.72-8.64 (m, 2H), 8.34 (d, J=0.5 Hz, 1H), 7.22-7.11 (m, 3H), 2.96 (hept, J=6.8 Hz, 2H), 1.64 (s, 1H), 1.19 (d, J=6.9 Hz, 12H). $^{13}$C NMR (101 MHz, CDCl$_3$) δ 154.72, 144.19, 144.18, 143.51, 142.97, 142.53, 124.52, 123.85, 54.57, 27.92, 24.39.

Example 6—In Situ Synthesis of Procatalysts 1-6. Small scale reactions were conducted by separately preparing 5 or 10 mM stock solutions of M(CH$_2$Ph)$_4$ and Ligand 1, 2, or 3 in C$_6$D$_6$ or toluene in the glovebox. The solutions were combined in the desired stoichiometry and mixed thoroughly at ambient temperature. When monitored by $^1$H NMR spectroscopy after at least 30 minutes showed complete conversion to the desired procatalyst under conditions relevant to Parallel Pressure Reactor (PPR) polymerization experiments.

Example 7—PPR Polymerization Experiments. Octene loading was determined for an initial octene:ethylene molar ratio of 2.24 at the selected temperature and pressure (90° C./100.5 psig, 120° C./150.0 psig, or 150° C./213.4 psig) providing ethylene-starved conditions for each experiment. Copolymerization screens were performed by hand-mixing a toluene solution of ZrBn$_4$ or HfBn$_4$ with a toluene solution of Ligand 1, 2, or 3 and allowed to react for at least 1 hour at ambient glovebox temperature. Each solution was separately activated with either B(C$_6$F$_5$)$_3$ (5 equiv.) or [HNMe(C$_{18}$H$_{37}$)$_2$][B(C$_6$F$_5$)$_4$] (1.5 equiv.), and each reactor vessel was charged with isopar-E to reach a total volume of 5.0 mL and MMAO-3A (500 nmol) producing at least 20 mg polymer. Molecular weight distribution (M$_w$, M$_n$) was determined by analysis on a Robotic Assisted Dilution High Temperature Gel Permeation Chromatographer (SymRAD-GPC). Polymer samples were dissolved in 1,2,4-trichlorobenzene (TCB; stabilized by 300 ppm BHT) at 170° C. Samples were diluted to a 1 mg/mL sample concentration and dispensed in 400 µL aliquots for each injection, with a 10 minute stagger between injections. The GPC utilized two (2) Polymer Labs PLgel 10 µm MIXED-B columns (300×10 mm) at a flow rate of 2.0 mL/minute at 160° C. Sample detection was performed using a PolyChar IR4 detector in concentration mode. A conventional calibration of narrow polystyrene (PS) standards was utilized, with apparent units adjusted to polyethylene (PE) using known Mark-Houwink coefficients for PS and PE in TCB at 160° C. Decane was used as a flow marker to ensure flow-rate integrity for both the calibration set and the experimental samples. Data was depicted using PolyChar GPC software.

Example 8—Polymerization Reactions

Catalyst activity (in terms of quench time and polymer yield) and resulting polymer characteristics were assessed for Procatalysts 1-6. The polymerization reactions were carried out in a batch reactor and parallel pressure reactor (PPR).

Procatalysts 1-6 were compared to comparative procatalysts, Comparative C1 (Comp. C1) and Comparative C2 (Comp C2). The structures of Comp. C1 and Comp C2 are shown below:

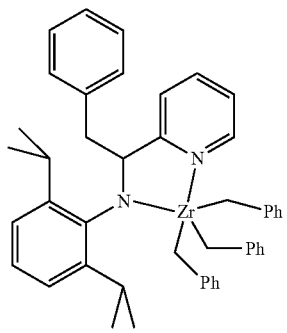

Comp. C1

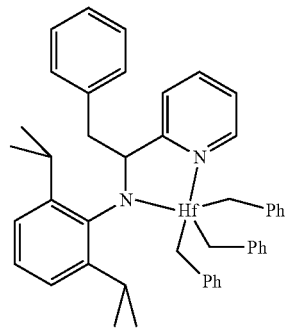

Comp. C2

The results recorded in Tables 1 to 4 were produced from procatalysts generated in situ. The polymerization experiments were conducted in a PPR reactor at 90° C., 120° C. or 150° C. using and activator and MMAO-3 (500 nmoles at 120° C. or 750 nmoles at 150° C.) was employed as the scavenger. In Table 1, [HNMe($C_{18}H_{37}$)$_2$][B($C_6F_5$)$_4$] was the activator in amounts of 1.5 molar equivalents in relation to the procatalyst. In Table 2, B($C_6F_5$)$_3$ was the activator in amounts of 5 molar equivalents in relation to the procatalyst, and.

TABLE 1

Polymerization Results with [HNMe($C_{18}H_{37}$)$_2$][B($C_6F_5$)$_4$] as the Activator

| Procatalyst | Ligand umol | Mol % $C_8$ | $M_n$ | Mw (g/mol) | PDI | $C_2$ Uptake (psig) | Pressure (psig) | Temp (° C.) | Yield (g) | Time (s) |
|---|---|---|---|---|---|---|---|---|---|---|
| Comp 1 | 0.1 | 9.8 | 23,194 | 372,407 | 16.1 | 51 | 100.5 | 90 | 0.144 | 54 |
| | 0.1 | 9.7 | 15,685 | 363,592 | 23.2 | 51 | 100.5 | 90 | 0.149 | 51 |
| | 0.1 | 7.8 | 21,966 | 210,813 | 9.6 | 50 | 150 | 120 | 0.110 | 64 |
| | 0.1 | 8.2 | 20,285 | 212,171 | 10.5 | 51 | 150 | 120 | 0.109 | 53 |
| | 0.1 | 7.7 | 19,926 | 212,633 | 10.7 | 50 | 150 | 120 | 0.114 | 53 |
| | 0.2 | 5.9 | 9,570 | 102,894 | 10.8 | 75 | 213.4 | 150 | 0.104 | 390 |
| | 0.2 | 5.4 | 7,598 | 108,168 | 14.2 | 75 | 213.4 | 150 | 0.105 | 630 |
| Comp 2 | 0.1 | 22.9 | 13,070 | 164,664 | 12.6 | 51 | 100.5 | 90 | 0.299 | 47 |
| | 0.1 | 19.2 | 15,027 | 197,420 | 13.1 | 52 | 100.5 | 90 | 0.297 | 50 |
| | 0.1 | 15.4 | 17,962 | 109,499 | 6.1 | 52 | 150 | 120 | 0.240 | 30 |
| | 0.1 | 16.6 | 14,949 | 107,521 | 7.2 | 52 | 150 | 120 | 0.235 | 21 |
| | 0.1 | 17.3 | 13,465 | 104,391 | 7.8 | 54 | 150 | 120 | 0.238 | 27 |
| | 0.1 | 5.3 | 55,909 | 210,247 | 3.8 | 36 | 213.4 | 150 | 0.049 | 1800 |
| | 0.1 | 5.2 | 48,531 | 205,837 | 4.2 | 27 | 213.4 | 150 | 0.032 | 1801 |
| | 0.2 | 11.6 | 11,316 | 57,883 | 5.1 | 76 | 213.4 | 150 | 0.190 | 35 |
| | 0.2 | 9.2 | 10,052 | 60,039 | 6.0 | 78 | 213.4 | 150 | 0.200 | 39 |
| Procat. 1 | 0.1 | 4.2 | 27,220 | 495,470 | 18.2 | 51 | 150 | 120 | 0.083 | 209 |
| | 0.1 | 4.3 | 23,343 | 460,633 | 19.7 | 50 | 150 | 120 | 0.077 | 175 |
| | 0.1 | 4.1 | 19,697 | 378,664 | 19.2 | 50 | 150 | 120 | 0.079 | 218 |
| | 0.1 | 4.1 | 18,804 | 380,053 | 20.2 | 50 | 150 | 120 | 0.079 | 218 |
| | 0.2 | 3.6 | 4,070 | 123,670 | 30.4 | 68 | 213.4 | 150 | 0.070 | 1800 |
| Procat. 2 | 0.1 | 4.8 | 30,161 | 608,228 | 20.2 | 50 | 150 | 120 | 0.049 | 970 |
| | 0.1 | 4.7 | 25,430 | 656,569 | 25.8 | 50 | 150 | 120 | 0.052 | 1581 |
| | 0.1 | 4.5 | 33,361 | 586,802 | 17.6 | 50 | 150 | 120 | 0.068 | 486 |
| | 0.1 | 5.1 | 20,136 | 587,213 | 29.2 | 50 | 150 | 120 | 0.068 | 316 |
| | 0.2 | 3.7 | 8,482 | 195,207 | 23.0 | 16 | 213.4 | 150 | 0.021 | 1801 |
| Procat. 3 | 0.1 | 11.7 | 105,357 | 653,363 | 6.2 | 50 | 100.5 | 90 | 0.133 | 159 |
| | 0.1 | 9.2 | 101,559 | 642,994 | 6.3 | 51 | 100.5 | 90 | 0.123 | 68 |
| | 0.1 | 5.6 | 43,259 | 487,305 | 11.3 | 50 | 150 | 120 | 0.071 | 153 |
| | 0.1 | 5.8 | 40,005 | 504,886 | 12.6 | 50 | 150 | 120 | 0.075 | 253 |
| | 0.1 | 7.0 | 70,902 | 459,616 | 6.5 | 50 | 150 | 120 | 0.071 | 152 |
| | 0.1 | 8.1 | 62,758 | 426,011 | 6.8 | 50 | 150 | 120 | 0.071 | 265 |
| | 0.1 | 7.5 | 37,618 | 400,984 | 10.7 | 50 | 150 | 120 | 0.077 | 430 |
| | 0.2 | 4.5 | 12,774 | 262,146 | 20.5 | 44 | 213.4 | 150 | 0.056 | 1801 |
| | 0.2 | 4.6 | 9,693 | 270,617 | 27.9 | 45 | 213.4 | 150 | 0.059 | 1801 |
| Procat. 4 | 0.1 | 4.5 | 55,683 | 427,797 | 7.7 | 50 | 150 | 120 | 0.095 | 293 |
| | 0.1 | 4.7 | 29,620 | 433,366 | 14.6 | 50 | 150 | 120 | 0.089 | 378 |
| | 0.2 | 5.2 | 18,431 | 103,334 | 5.6 | 75 | 213.4 | 150 | 0.143 | 98 |
| | 0.2 | 6.0 | 11,908 | 101,512 | 8.5 | 76 | 213.4 | 150 | 0.165 | 57 |
| Procat. 5 | 0.1 | 5.0 | 35,378 | 649,600 | 18.4 | 26 | 150 | 120 | 0.030 | 1801 |
| | 0.1 | 4.8 | 30,526 | 623,708 | 20.4 | 28 | 150 | 120 | 0.028 | 1801 |
| | 0.2 | 4.2 | 29,244 | 332,296 | 11.4 | 57 | 213.4 | 150 | 0.076 | 1801 |
| | 0.2 | 3.9 | 20,832 | 346,178 | 16.6 | 44 | 213.4 | 150 | 0.058 | 1801 |
| | 0.1 | 12.6 | 177,878 | 755,524 | 4.3 | 51 | 100.5 | 90 | 0.215 | 64 |

TABLE 1-continued

Polymerization Results with [HNMe(C$_{18}$H$_{37}$)$_2$][B(C$_6$F$_5$)$_4$] as the Activator

| Procatalyst | Ligand umol | Mol % C$_8$ | M$_n$ | Mw (g/mol) | PDI | C$_2$ Uptake (psig) | Pressure (psig) | Temp (° C.) | Yield (g) | Time (s) |
|---|---|---|---|---|---|---|---|---|---|---|
| Procat. 6 | 0.1 | 12.6 | 152,008 | 695,121 | 4.6 | 53 | 100.5 | 90 | 0.169 | 68 |
| | 0.1 | 11.6 | 85,776 | 355,964 | 4.2 | 51 | 150 | 120 | 0.152 | 66 |
| | 0.1 | 11.1 | 65,411 | 336,820 | 5.2 | 51 | 150 | 120 | 0.139 | 70 |
| | 0.2 | 7.0 | 36,817 | 162,368 | 4.4 | 69 | 213.4 | 150 | 0.101 | 1800 |
| | 0.2 | 6.9 | 26,925 | 153,436 | 5.7 | 70 | 213.4 | 150 | 0.101 | 1800 |

TABLE 2

Polymerization Results with B(C$_6$F$_5$)$_3$ as the Activator

| Procatalyst | Ligand μmol | Mol % C$_8$ | M$_n$ | Mw (g/mol) | PDI | C$_2$ Uptake (psig) | Pressure (psig) | Temp (° C.) | Yield (g) | Time (s) |
|---|---|---|---|---|---|---|---|---|---|---|
| Comp 1 | 0.1 | 6.4 | 116,319 | 316,138 | 2.7 | 50 | 100.5 | 90 | 0.076 | 193 |
| | 0.1 | 5.6 | 102,716 | 293,688 | 2.9 | 50 | 100.5 | 90 | 0.071 | 250 |
| | 0.1 | 5.0 | 55,609 | 150,447 | 2.7 | 20 | 150 | 120 | 0.02 | 1801 |
| | 0.1 | 5.1 | 56,139 | 157,497 | 2.8 | 23 | 150 | 120 | 0.021 | 1800 |
| Comp 2 | 0.1 | 9.0 | 139,164 | 323,635 | 2.3 | 50 | 100.5 | 90 | 0.103 | 148 |
| | 0.1 | 9.4 | 138,450 | 326,326 | 2.4 | 51 | 100.5 | 90 | 0.105 | 131 |
| | 0.1 | 6.8 | 78,239 | 182,123 | 2.3 | 38 | 150 | 120 | 0.04 | 1801 |
| | 0.1 | 7.1 | 68,879 | 181,406 | 2.6 | 44 | 150 | 120 | 0.047 | 1802 |
| | 0.1 | 6.2 | 67,667 | 187,865 | 2.8 | 39 | 150 | 120 | 0.044 | 1801 |
| Procat. 1 | 0.1 | 2.5 | 11,191 | 197,923 | 17.7 | 19 | 150 | 120 | 0.021 | 1800 |
| | 0.1 | 2.6 | 11,803 | 214,436 | 18.2 | 21 | 150 | 120 | 0.021 | 1802 |
| | 0.1 | 2.6 | 11,434 | 216,066 | 18.9 | 21 | 150 | 120 | 0.022 | 1802 |
| | 0.1 | 2.5 | 10,148 | 207,078 | 20.4 | 20 | 150 | 120 | 0.021 | 1801 |
| | 0.1 | 3.1 | 11,379 | 253,986 | 22.3 | 20 | 150 | 120 | 0.021 | 1800 |
| Procat. 2 | 0.1 | 3.0 | 38,095 | 476,008 | 12.5 | 20 | 150 | 120 | 0.021 | 1802 |
| | 0.1 | 3.5 | 33,430 | 480,714 | 14.4 | 20 | 150 | 120 | 0.021 | 1801 |
| Procat. 3 | 0.1 | 2.9 | 95,259 | 584,252 | 6.1 | 50 | 100.5 | 90 | 0.069 | 106 |
| | 0.1 | 2.5 | 85,288 | 571,595 | 6.7 | 51 | 100.5 | 90 | 0.069 | 95 |
| | 0.1 | 2.9 | 29,815 | 311,859 | 10.5 | 20 | 150 | 120 | 0.021 | 1801 |
| Procat. 4 | 0.1 | 3.3 | 12,372 | 68,939 | 5.6 | 28 | 150 | 120 | 0.03 | 1802 |
| | 0.1 | 3.6 | 13,887 | 94,925 | 6.8 | 28 | 150 | 120 | 0.029 | 1801 |
| | 0.1 | 3.3 | 12,175 | 86,128 | 7.1 | 30 | 150 | 120 | 0.034 | 1800 |
| | 0.1 | 3.7 | 13,541 | 102,043 | 7.5 | 27 | 150 | 120 | 0.028 | 1801 |
| | 0.1 | 3.4 | 11,176 | 86,729 | 7.8 | 24 | 150 | 120 | 0.026 | 1802 |
| | 0.1 | 3.4 | 11,735 | 100,364 | 8.6 | 26 | 150 | 120 | 0.03 | 1800 |
| Procat. 6 | 0.1 | 4.6 | 169,895 | 1,412,128 | 8.3 | 50 | 100.5 | 90 | 0.083 | 249 |
| | 0.1 | 4.9 | 132,093 | 1,378,669 | 10.4 | 50 | 100.5 | 90 | 0.081 | 589 |

Procatalysts 1 to 6 are analogs of diazine donors—pyrimidine, pyrazine, and quinoxaline. Procatalyst 1 to 6 produced high molecular weight polymers with incorporation of 1-octene ranging from 2 mole percent to 12 mole percent in PPR copolymerization screens.

Procatalyst 1 to 6 produced polymers having a molecular weight (M$_w$) greater than 400 kg/mol at 120° C., and a molecular weight of greater than 250 kg/mol at 150° C.

In Table 2, a quinoxaline derivative, Procatalyst 6 (Procat. 6) produced polymers exhibiting a molecular weight of greater 1,300 kg/mol at 90° C.

The data recorded in the plots of FIG. 2A, FIG. 2B, FIG. 3A, and FIG. 3B indicate that the molecular weights of the polymers produced by the diazine donors, Procatalysts 1 to 6, are greater than those obtained for pyridine donors operating under identical PPR screening conditions.

The invention claimed is:

1. A catalyst system comprising a metal-ligand complex according to formula (I):

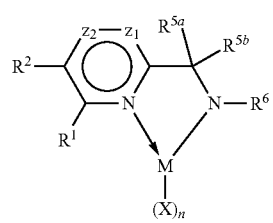

where
M is a metal chosen from zirconium or hafnium, the metal having a formal oxidation state of +2, +3, or +4;
each X is a monodentate or bidentate ligand independently chosen from (C$_1$-C$_{40}$) hydrocarbyl, (C$_6$-C$_{20}$) aryl, (C$_6$-C$_{20}$) heteroaryl, or halogen;
n is 2 or 3;
R$^1$, R$^2$, R$^{5a}$, R$^{5b}$, and R$^6$ are independently chosen from (C$_1$-C$_{40}$) hydrocarbyl, (C$_1$-C$_{40}$) heterohydrocarbyl, —Si(R$^C$)$_3$, —N(R$^N$)$_2$, —OR$^C$, halogen, or hydrogen;
optionally, R$^1$ and R$^2$ are covalently linked to form an aromatic ring;

$z_1$ and $z_2$ are independently $C(R^Z)$ or N, wherein each $R^Z$ is —H or $(C_1-C_{30})$ hydrocarbyl;

provided that at least one of $z_1$ and $z_2$ is N; and each $R^C$ and $R^N$ in formula (I) is independently a $(C_1-C_{30})$ hydrocarbyl.

2. The catalyst system of claim 1, wherein $R^1$ and $R^2$ are covalently linked to form an aromatic ring, and the metal-ligand complex is according to formula (II):

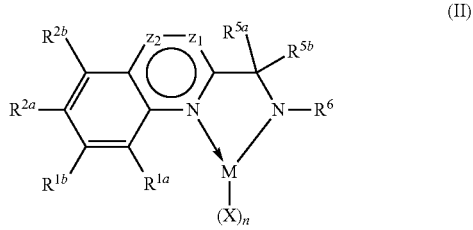

(II)

where $R^{1a}$, $R^{1b}$, $R^{2a}$, $R^{2b}$ are independently $(C_1-C_{30})$ alkyl; and $R^{5a}$, $R^{5b}$, $z_1$, $z_2$, X, n, and M are as defined in formula (I).

3. The catalyst system of claim 1, wherein each X is independently benzyl, phenyl, or chloro.

4. The catalyst system of claim 1, wherein $z_1$ is $C(R^Z)$ and $z_2$ is N, wherein in $R^Z$ is —H or $(C_1-C_{30})$ hydrocarbyl.

5. The catalyst system of claim 1, wherein $z_1$ is N and $z_2$ is $C(R^Z)$, wherein in $R^Z$ is —H or $(C_1-C_{30})$ hydrocarbyl.

6. The catalyst system of claim 1, wherein $R^6$ is a substituted $(C_6-C_{40})$ aryl or an unsubstituted $(C_6-C_{40})$ aryl.

7. The catalyst system of claim 1, wherein $R^6$ is independently selected from phenyl, benzyl, (2,4,6-tri-iso-propyl) phenyl, (2,6-di-iso-propyl) phenyl, 3,5-di-tert-butylphenyl, naphthyl, or cyclopropyl.

8. The catalyst system of claim 1, wherein $R^6$ is hydrogen; $R^{5a}$ is hydrogen; and $R^{5b}$ is independently chosen from $(C_1-C_{40})$ hydrocarbyl or $(C_1-C_{40})$ heterohydrocarbyl.

9. The catalyst system of claim 1, wherein $R^6$ is hydrogen; $R^{5a}$ is hydrogen; and $R^{5b}$ is independently chosen from phenyl, benzyl, (2,4,6-tri-iso-propyl) phenyl, (2,6-di-iso-propyl) phenyl, 3,5-di-tert-butylphenyl, naphthyl, or cyclopropyl.

10. The catalyst system of claim 1, wherein $R^{5a}$ and $R^{5b}$ are hydrogen.

11. A polymerization process comprising:

polymerizing ethylene and one or more olefins in the presence of a catalyst system under olefin polymerization conditions to form an ethylene-based polymer, the catalyst system comprising a metal-ligand complex according to formula (I) of claim 1.

* * * * *